United States Patent [19]

Petke

[11] 3,944,516

[45] Mar. 16, 1976

[54] ADHESIVE COMPOSITION

[75] Inventor: Frederick D. Petke, Kingsport, Tenn.

[73] Assignee: Eastman Kodak Company, Rochester, N.Y.

[22] Filed: Apr. 7, 1975

[21] Appl. No.: 565,906

[52] U.S. Cl............. 260/40 R; 260/75 R; 260/873
[51] Int. Cl.² .................. C08K 3/26; C08L 67/02
[58] Field of Search ................ 260/873, 75 R, 40 R

[56] References Cited
UNITED STATES PATENTS

| | | | |
|---|---|---|---|
| 3,642,945 | 2/1972 | Cleary | 260/873 |
| 3,644,267 | 2/1972 | Jackson, Jr. | 260/873 |
| 3,795,644 | 3/1974 | Jackson, Jr. | 260/75 R |

*Primary Examiner*—Murray Tillman
*Assistant Examiner*—J. Ziegler
*Attorney, Agent, or Firm*—Charles R. Martin; Daniel B. Reece, III

[57] ABSTRACT

Disclosed is a hot-melt adhesive composition comprised of an admixture of a polyetherester, polystyrene and optionally a filler. The adhesive composition exhibits a desirable overall balance of properties, including good bond strength, particularly after aging. In a preferred embodiment, the adhesive composition can be used to bond poly(vinyl chloride) to wood or particleboard.

3 Claims, No Drawings

ADHESIVE COMPOSITION

This invention relates to a hot-melt adhesive that exhibits a desirable overall balance of properties, including good bond strength, particularly after aging.

The use of plastics for preparing surfacing and trim components of manufactured articles has increased tremendously in the last several decades. Today a wide variety of manufactured articles, such as furniture, kitchen appliances, electrical appliances, and automotive parts have surfaces and trim components prepared from plastics.

One area where plastics have gained particularly wide acceptance as surface components is in the furniture industry. Today application of decorative bands, often called edgebands, to the edges of laminated furniture tops is a common practice in the manufacture of domestic and commercial furniture. In mass-produced furniture items, such as tables and desks, the bands can be applied automatically using commercially available edgebanding equipment to apply a hot-melt adhesive directly to the edgebands prior to installation. The hot-melt adhesives that are currently being used are thought to be either ethylene-vinyl acetate copolymer type adhesives or polyethylene type adhesives. Ethylene-vinyl acetate copolymer type adhesives generally do not perform well when the furniture is kept in a hot environment, such as during oven curing of the lacquer finish or during shipment in hot weather. Polyethylene type adhesives have satisfactory heat resistance, but they are prone to lose bond strength on aging on many substrates and they do not provide adequate adhesion to plasticized poly(vinyl chloride).

We have now invented an adhesive composition that exhibits a desirable overall balance of properties, including good bond strength, particularly after aging.

As described above, the adhesive composition of this invention exhibits good bond strength. In many instances the adhesive compositions of this invention exhibit a level of adhesion between poly(vinyl chloride) and wood or particleboard such that the bonds exhibit cohesive failure. By the term "cohesive failure", and words of similar import, it is meant that the bond failure resulted from failure of the substrate and not the adhesive. As an example, when a cohesive failure occurs when wood is the substrate, fibers are pulled from the wood resulting in a failure of the wood in tension. As will be recognized by those skilled in the art, cohesive failure represents a maximum bond strength for an adhesive bond.

One of the most advantageous properties of the adhesive composition of this invention is the bond strength after aging. For example, bonds formed from the adhesive composition of this invention exhibit cohesive failure between plasticized poly(vinyl chloride) and wood or particle board after the bond has been aged one month at 50°C. and tested at −17° to 50°C. and also after the bond has been aged three months at 23°C. and tested at −17° to 50°C. or even after the bond has been aged 30 minutes at 100°C. and tested at 23°C.

Another of the advantageous properties of the adhesive composition of this invention is the immediate bond strength. By the term "immediate bond strength" and words of similar import, it is meant that the strength of the bond is measured a short period of time after the composition has initially cooled from its application temperature to a lower temperature. The adhesive compositions of this invention can be used to prepare bonds having an immediate bond strength such that the bonds generally exhibit cohesive failure between poly(vinyl chloride) and wood or particleboard when tested at −17.5°C., 23°C. and 50°C.

Still another of the advantageous properties of the adhesive composition of this invention is its sandability. The adhesive compositions of the invention exhibit substantially the same sandability as particleboard or wood; therefore, if a substrate is improperly bonded to wood or particleboard it can be removed, the adhesive sanded off and the substrate rebonded.

Still another advantageous property of the adhesive compositions of this invention is its melt viscosity. The adhesive compositions of this invention have a melt viscosity suitable for application with conventional apparatus for applying hot-melt adhesives, such as wheel applicators.

The unpublished prior art applicants are aware of is a polyester hot-melt adhesive sold by Ornsteen Chemical Co. designated Hi-Per 350P, which is believed to be composed of 40 mole percent terephthalic acid, 40 mole percent isophthalic acid, 20 mole percent sebacic acid, and 100 mole percent 1,4-butanediol, and is recommended by the manufacturer for bonding poly(vinyl chloride).

Broadly the adhesive composition of this invention can be described as an admixture of a polyetherester, polystyrene and optionally can contain a filter.

More specifically, the adhesive composition of this invention can be described as an admixture comprising, based on the weight of the composition, A. from 95–60 weight percent of a polyetherester having an inherent viscosity in the range of 0.5 to 1.4, the polyetherester being comprised of
  1. a dicarboxylic acid component comprised of
    a. from 90–60 mole percent terephthalic acid,
    b. from 10–40 mole percent, cis/trans hexahydroterephthalic acid,
  2. a diol component comprised of, based on the weight of the diol component,
    a. 80–60 weight percent 1,4-butanediol,
    b. 20–40 weight percent poly(tetramethylene glycol) having an average molecular weight in the range of 600–2000, and
B. from 5–40 weight percent polystyrene having an inherent viscosity in the range of 0.2 to 0.7.

Optionally an inert, inorganic filler (C) can be incorporated into the admixture.

In this invention, the dicarboxylic acid component of the polyetherester compound (A) is comprised of a combination of terephthalic acid and cis/trans hexahydroterephthalic acid. Broadly, the range of terephthalic acid can be from 90–60 mole percent. More specifically, the range of terephthalic acid can be from 75–65 mole percent. Most preferably, the amount of terephthalic acid is about 70 mole percent. The amount of cis/trans hexahydroterephthalic acid can be broadly from 10–40 mole percent, but more preferably can be 25–35 mole percent and most preferably is about 30 mole percent. In this invention the term "cis/trans hexahydroterephthalic acid" means an equilibrium mixture of about 70–65 weight percent cis isomer and about 30–35 weight percent trans isomer of hexahydroterephthalic acid, which is some times called 1,4-cyclohexanedicarboxylic acid.

The diol component of the polyetherester component (A) is comprised of a combination of 1,4- butanediol and poly(tetramethylene glycol). Broadly, the amount of 1,4-butanediol can be from 80–60 weight percent, based on the weight of the diol component. More specifically, the 1,4-butanediol can range from 80–70 weight percent. Most preferably, the 1,4-butanediol is about 75 weight percent. The poly(tetramethylene glycol) can broadly range from 20–40 weight percent, based on the weight of the diol component. More specifically, the poly(tetramethylene glycol) can range from 30–20 weight percent, and most preferably is about 25 weight percent. The molecular weight of the poly(tetramethylene glycol) can broadly be from 600–2000 and preferably is about 1000.

The amount of polyetherester component (A) in the adhesive composition can broadly be from 96–60 weight percent, based on the weight of the composition, but more preferably can be from 85–30 weight percent, and most preferably is about 49 weight percent.

The inherent viscosity of the polyetherester component (A) can broadly be from 0.5 to 1.4. Lower inherent viscosities often result in the composition being too brittle while higher inherent viscosities often result in compositions which cannot be applied by wheel applicators due to their high melt viscosities. More preferably the inherent viscosity of the polyetherester component (A) can be from 0.5 to 0.80 and most preferably can be from 0.60 to 0.75. The inherent viscosity of polyetherester component (A) is measured at 25°C. using 0.23 grams of polymer per 100 ml. of a solvent composed of 60 volumes of phenol and 40 volumes of tetrachloroethane.

The polyetherester component (A) can be prepared by techniques well known in the art such as direct condensation or ester interchange. In a preferred embodiment the dicarboxylic acid components are esterified into a suitable diester, such as the dimethyl ester, and then reacted with a mixture of the glycol components and suitable amounts of an appropriate catalyst, such as titanium tetraisopropoxide. After ester interchange, the temperature is raised to a high temperature, such as 250°C., and a vacuum is applied to the flask to remove excess 1,4-butanediol; the polycondensation continues under these conditions until the desired inherent viscosity is reached, after which the flask is repressurized with nitrogen and the polymer is cooled to a solid.

The polystyrene component (B) is well known in the art. The polystyrene component (B) can contain minor amounts of other unsaturated monomers copolymerizable with styrene. One suitable polystyrene component (B) is Piccolastic D150 sold by Hercules, Inc., which is thought to be chiefly styrene copolymerized with small amounts of other similar monomers. Another suitable polystyrene is Styron 686 sold by Dow Chemical Co. which is thought to be essentially polystyrene.

The polystyrene component (B) can broadly range from 5–40 weight percent, based on the weight of the composition. More preferably, the polystyrene component (B) can range from 10–30 weight percent and more preferably can be about 21 weight percent.

The inherent viscosity of the polystyrene can broadly be from 0.2 to 0.7. More preferably, the inherent viscosity of the polystyrene can be from 0.2 to 0.5, and even more preferably from 0.2 to 0.4. The inherent viscosity of the polystyrene is measured at 23°C. in a solution of 0.5 g. of polystyrene per 100 ml. of a mixture of 60 weight parts of phenol and 40 weight parts of tetrachloroethane.

As described above, the adhesive composition of this invention always contains the polyetherester component (A) and the polystyrene component (B) and optionally can contain an inert inorganic filler component (C). The inert inorganic filler useful in this invention can broadly be described as a high-melting solid having particles less than about 500 micron diameter, such as salts of various metal cations, oxides of metals, clays and carbon black. More specifically the inert inorganic filler component (C) can be described as an oxide of a transition metal such as a carbonate, oxide, phosphate or sulfate, as well as other salts of transition metals and alkali and alkaline earth metals, carbon black, and mixed salts of metal cations and several anions. Examples of suitable inert inorganic fillers include $CaCO_3$, $ZnO$, $TiO_2$ (anatase or rutile), $SiO_2$, $Ca_3(PO_4)_2$, talc, $Na_2SO_4$. $CaCO_3$ is a preferred filler because of its low cost.

The amount of inert, inorganic filler component (C) can range from 5–40 weight percent and more preferably can be about 30 weight percent based on the weight of the composition.

The adhesive compositions of this invention can be prepared in accordance with techniques well known in the art for forming admixtures. In the embodiment of the invention wherein the adhesive composition comprises polyetherester component (A) and polystyrene component (B), the composition can be prepared by thorough mixing of the correct amounts of components (A) and (B) at temperatures at which both components (A) and (B), are molten, as for example by extrusion, by use of a sigma-blade mixer or by roll milling. Preferably the components are mixed by extrusion.

In the embodiment of the invention wherein the adhesive composition comprises polyetherester component (A), polystyrene component (B) and inert, inorganic filler component (C), the composition can be prepared by mixing the correct amounts of molten components (A) and (B) together with component (C) in finely divided form and them the materials are melt mixed by conventional techniques such as extrusion, use of a sigma-blade mixer or by roll milling. Although extrusion is the preferred method when the size of the filler particles is small, the roll milling technique is preferred to reduce the size of the filler particles when the size of the filler particles is large.

The adhesive composition of this invention can contain other components, such as stabilizers, pigments, dyes, extenders and numerous other conventional modifiers.

The compositions of this invention are useful as hot-melt adhesives. As is well known in the art, the term "hot-melt adhesive" means that the adhesive is applied by heating the composition until it assumes the character of a viscous liquid, applying the adhesive to the members to be bonded and bonding the members together by allowing the adhesive to cool to a lower temperature and assume a solid form.

The compositions of this invention can be used in accordance with methods and apparatus well known in the art for applying hot-melt adhesives. For example, the composition can be melted and applied from a conventional wheel applicator.

Although the invention has been described in considerable detail with particular reference to certain preferred embodiments thereof, variations and modifications can be effected within the spirit and scope of the invention. More specifically, the adhesive compositions of this invention can be used to bond a variety of substrates together. As has been disclosed in detail, the adhesive compositions of this invention are particularly adapted for bonding plasticized poly(vinyl chloride) to wood or particle board. The adhesive compositions of this invention can also be used to bond a variety of other substrates such as wood, paper and Formica to wood or particleboard.

We claim:

1. A composition comprising, based on the weight of the composition, an admixture of
   A. from 95–60 weight percent of a polyetherester having an inherent viscosity in the range of 0.5 to 1.4, the polyetherester being comprised of
      1. a dicarboxylic acid component comprised of
         a. from 90–60 mole percent terephthalic acid,
         b. from 10–40 mole percent cis/trans hexahydroterephthalic acid,
      2. a diol component comprised of, based on the weight of the diol component
         a. 80–60 weight percent 1,4-butanediol,
         b. 20–40 weight percent poly(tetramethylene glycol) having an average molecular weight in the range of 600–2000, and
   B. from 5–40 weight percent polystyrene having an inherent viscosity in the range of 0.2 to 0.7.

2. A composition comprising, based on the weight of the composition, an admixture of
   A. from 85–30 weight percent of a polyetherester having an inherent viscosity in the range of 0.50 to 0.80, the polyetherester being comprised of
      1. a dicarboxylic acid component comprised of
         a. from 75–65 mole percent terephthalic acid,
         b. from 25–35 mole percent cis/trans hexahydroterephthalic acid,
      2. a diol component comprised of, based on the weight of the diol component,
         a. 80–70 weight percent 1,4-butanediol,
         b. 20–30 weight percent poly(tetramethylene glycol) having an average molecular weight in the range of 600–2000,
   B. from 10–30 weight percent polystyrene having an inherent viscosity in the range of 0.2 to 0.5, and
   C. from 5–40 weight percent of an inert, inorganic filler.

3. A composition comprising, based on the weight of the composition, an admixture of
   A. about 49 weight percent of a polyetherester having an inherent viscosity in the range of 0.60 to 0.75, the polyetherester being comprised of
      1. a dicarboxylic acid component comprised of
         a. about 70 mole percent terephthalic acid,
         b. about 30 mole percent cis/trans hexahydroterephthalic acid,
      2. a diol component comprised of, based on the weight of the diol component,
         a. about 75 weight percent 1,4-butanediol,
         b. about 25 weight percent poly(tetramethylene glycol) having an average molecular weight of about 1000,
   B. about 21 weight percent polystyrene having an inherent viscosity in the range of 0.2 to 0.4, and
   C. about 30 weight percent $CaCO_3$.

* * * * *